(12) United States Patent
Lee et al.

(10) Patent No.: US 12,128,503 B2
(45) Date of Patent: Oct. 29, 2024

(54) LASER APPARATUS AND LASER MACHINING METHOD

(71) Applicant: SAMSUNG DISPLAY CO., LTD., Yongin-si (KR)

(72) Inventors: Sung Yong Lee, Seongnam-si (KR); Toshinaru Suzuki, Suwon-si (KR); Seung Ho Myoung, Hwaseong-si (KR); Gyeong Hee Han, Yongin-si (KR); Gyoo Wan Han, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/111,940

(22) Filed: Feb. 21, 2023

(65) Prior Publication Data
US 2023/0201969 A1    Jun. 29, 2023

Related U.S. Application Data

(62) Division of application No. 16/862,815, filed on Apr. 30, 2020, now Pat. No. 11,612,964.

(30) Foreign Application Priority Data

Aug. 22, 2019    (KR) .................. 10-2019-0103025

(51) Int. Cl.
*B23K 26/38*    (2014.01)
*B23K 26/12*    (2014.01)
(Continued)

(52) U.S. Cl.
CPC .......... *B23K 26/38* (2013.01); *B23K 26/1224* (2015.10); *B23K 26/127* (2013.01); *B23K 26/706* (2015.10); *B23K 2101/40* (2018.08)

(58) Field of Classification Search
CPC .. B23K 26/38; B23K 26/1224; B23K 26/706; B23K 26/127; B23K 2101/40
(Continued)

(56) References Cited

U.S. PATENT DOCUMENTS

| | | | |
|---|---|---|---|
| 4,278,867 A * | 7/1981 | Tan ...................... | B23K 26/123 219/121.64 |
| 4,434,189 A * | 2/1984 | Zaplatynsky ............. | C23C 8/06 427/586 |

(Continued)

FOREIGN PATENT DOCUMENTS

| | | |
|---|---|---|
| CN | 101370612 | 2/2009 |
| CN | 202943362 | 5/2013 |

(Continued)

OTHER PUBLICATIONS

Korean Office Action issued in corresponding Korean Patent Application No. 10-2019-0103025 issued on Feb. 18, 2021.
(Continued)

*Primary Examiner* — Jimmy Chou
(74) *Attorney, Agent, or Firm* — F. CHAU & ASSOCIATES, LLC

(57) ABSTRACT

A laser apparatus includes: a first vacuum chamber, wherein machining is performed on a target substrate in the first vacuum chamber; a laser facing the first vacuum chamber; a carrier disposed in the first vacuum chamber, wherein the target substrate is seated on the carrier; a chamber window disposed in one surface of the first vacuum chamber, wherein a laser beam emitted by the laser passes through the chamber window; a first protection window positioned between the carrier and the chamber window; a second vacuum chamber disposed at a first side of the first vacuum chamber; and a transfer unit configured to transfer the first protection window to the second vacuum chamber.

6 Claims, 15 Drawing Sheets

(51) Int. Cl.
*B23K 26/70* (2014.01)
*B23K 101/40* (2006.01)

(58) Field of Classification Search
USPC .................... 219/121.67, 121.68, 121.69
See application file for complete search history.

(56) References Cited

U.S. PATENT DOCUMENTS

| | | | | |
|---|---|---|---|---|
| 5,085,166 | A * | 2/1992 | Oka | C23C 14/28 |
| | | | | 118/727 |
| 5,227,608 | A * | 7/1993 | Yoshida | B23K 26/16 |
| | | | | 219/121.84 |
| 5,275,214 | A * | 1/1994 | Rehberger | B23K 26/142 |
| | | | | 141/97 |
| 5,322,988 | A * | 6/1994 | Russell | H01L 31/0236 |
| | | | | 216/75 |
| 5,669,979 | A * | 9/1997 | Elliott | H01L 21/02052 |
| | | | | 134/1 |
| 5,923,966 | A | 7/1999 | Teramoto et al. | |
| 6,166,509 | A * | 12/2000 | Wyka | G05B 19/404 |
| | | | | 414/936 |
| 6,407,373 | B1 * | 6/2002 | Dotan | H01L 29/7834 |
| | | | | 257/E29.267 |
| 6,473,989 | B2 * | 11/2002 | Kato | H01L 21/67736 |
| | | | | 414/217 |
| 6,482,687 | B2 | 11/2002 | Teramoto et al. | |
| 6,495,404 | B1 | 12/2002 | Teramoto et al. | |
| 6,650,464 | B2 * | 11/2003 | Akai | H10K 71/18 |
| | | | | 315/111.21 |
| 6,707,544 | B1 * | 3/2004 | Hunter | G01N 21/956 |
| | | | | 356/237.4 |
| 6,753,213 | B2 | 6/2004 | Teramoto et al. | |
| 7,097,712 | B1 * | 8/2006 | Yamazaki | H01L 29/66757 |
| | | | | 118/900 |
| 7,880,138 | B2 * | 2/2011 | Lee | G01N 21/718 |
| | | | | 250/288 |
| 8,099,192 | B2 * | 1/2012 | Genetti | B25J 9/1694 |
| | | | | 414/730 |
| 8,115,180 | B2 * | 2/2012 | Doemer | B23K 26/082 |
| | | | | 250/442.11 |
| 8,546,717 | B2 * | 10/2013 | Stecker | B22F 12/38 |
| | | | | 219/121.13 |
| 9,816,946 | B2 * | 11/2017 | Stegmann | G01N 23/04 |
| 9,929,034 | B2 * | 3/2018 | Goto | H01L 21/67778 |
| 11,213,913 | B2 | 1/2022 | Choi et al. | |
| 2002/0170891 | A1 * | 11/2002 | Boyle | B23K 26/123 |
| | | | | 216/13 |
| 2003/0106881 | A1 * | 6/2003 | Lee | H01J 37/32082 |
| | | | | 219/121.68 |
| 2004/0016888 | A1 * | 1/2004 | Haraguchi | H01J 37/28 |
| | | | | 250/311 |
| 2004/0240971 | A1 * | 12/2004 | Tezuka | H01L 21/67742 |
| | | | | 414/217 |
| 2008/0067160 | A1 * | 3/2008 | Suutarinen | B23K 26/1224 |
| | | | | 219/121.67 |
| 2009/0020513 | A1 | 1/2009 | O'Halloran et al. | |
| 2010/0051828 | A1 * | 3/2010 | Doemer | B23K 26/032 |
| | | | | 250/492.1 |
| 2010/0108648 | A1 * | 5/2010 | Koseki | B23K 26/12 |
| | | | | 219/121.84 |
| 2011/0163068 | A1 * | 7/2011 | Utlaut | G03F 1/84 |
| | | | | 216/66 |
| 2011/0198326 | A1 * | 8/2011 | Doemer | B23K 26/032 |
| | | | | 219/121.72 |
| 2012/0043460 | A1 * | 2/2012 | Wouters | H01J 49/0404 |
| | | | | 250/288 |
| 2012/0071003 | A1 * | 3/2012 | Dobashi | H01L 21/306 |
| | | | | 438/758 |
| 2012/0132799 | A1 * | 5/2012 | Takahashi | H01J 49/0004 |
| | | | | 250/288 |
| 2013/0122687 | A1 * | 5/2013 | Holden | H01L 21/78 |
| | | | | 219/385 |
| 2013/0213945 | A1 * | 8/2013 | Stegmann | G01N 23/04 |
| | | | | 219/121.83 |
| 2013/0341313 | A1 * | 12/2013 | Himmelsbach | B23K 26/70 |
| | | | | 219/121.86 |
| 2017/0304951 | A1 * | 10/2017 | Lee | B23K 26/1464 |
| 2018/0333806 | A1 * | 11/2018 | Cherubini | B23K 26/0876 |
| 2021/0053159 | A1 | 2/2021 | Lee et al. | |
| 2022/0033195 | A1 * | 2/2022 | Bae | B23K 26/38 |

FOREIGN PATENT DOCUMENTS

| | | | | |
|---|---|---|---|---|
| CN | 205551813 | | 9/2016 | |
| CN | 208391284 | | 1/2019 | |
| JP | 2014-237150 | | 12/2014 | |
| JP | 2016-181642 | | 10/2016 | |
| KR | 10-0341708 | B1 | 11/2002 | |
| KR | 10-0634623 | | 10/2006 | |
| KR | 100634623 | B1 * | 10/2006 | ........... B23K 26/046 |
| KR | 10-1631145 | | 6/2016 | |
| KR | 10-1718716 | | 3/2017 | |
| KR | 10-2017-0081326 | | 7/2017 | |
| KR | 10-1759522 | | 7/2017 | |
| KR | 10-1761585 | | 7/2017 | |
| KR | 101759522 | B1 * | 7/2017 | ........... H01L 21/027 |
| KR | 10-1906288 | | 12/2018 | |
| KR | 10-1930238 | | 12/2018 | |
| KR | 10-1937360 | | 1/2019 | |

OTHER PUBLICATIONS

Notice of Allowance issued in corresponding Korean Patent Application No. 10-2019-0103025 on Jun. 21, 2021.
Chinese Office Action issued in corresponding Chinese Patent Application No. 202010778290.8 on Jul. 5, 2022.
Office Action issued in corresponding application No. KR 10-2022-0030085 on Jul. 30, 2024.

* cited by examiner

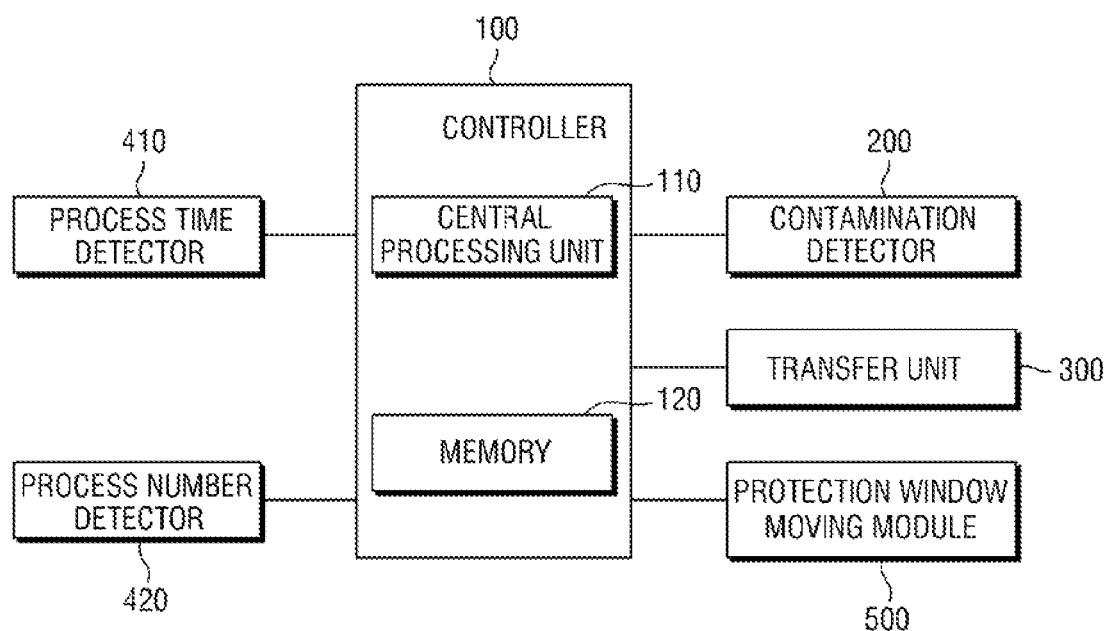

LASER APPARATUS AND LASER MACHINING METHOD

CROSS-REFERENCE TO RELATED APPLICATIONS

This application is a Divisional application of U.S. patent application Ser. No. 16/862,815 filed on Apr. 30, 2020, which claims priority under 35 U.S.C § 119 to Korean Patent Application No. 10-2019-0103025 filed on Aug. 22, 2019 in the Korean Intellectual Property Office, the disclosures of which are incorporated by reference herein in their entireties.

TECHNICAL FIELD

The present invention relates to a laser apparatus and a laser machining method.

DISCUSSION OF THE RELATED ART

Demand for displays is increasing with development of multimedia. Accordingly, various kinds of displays such as liquid crystal displays (LCDs) and organic light emitting displays (OLEDs) are in use.

Organic light emitting displays display images using organic light emitting diodes (OLEDs) in which light is generated by recombination of electrons and holes. Generally, the organic light emitting display has a relatively quick response time, a relatively high brightness, and a wide viewing angle. In addition, the organic light emitting display may be driven with low power consumption.

Various physical and chemical methods are used in machining processes for organic light emitting displays like in semiconductor manufacturing processes. For example, etching or drilling processes using lasers can be used. Machining performed on substrates using lasers is widely used because of simple structures and short processing times when compared to other methods.

In addition, in a case in which a machining process is performed using a laser module, since particles delaminated and detached from a substrate are accumulated on a protection window of a laser apparatus during the machining process, the protection window should be replaced or cleaned. In this case, since a vacuum chamber should be opened for replacement or cleaning and the machining process should stop until the chamber reaches a vacuum state after the replacement or cleaning is performed, production efficiency may be reduced.

In addition, since an organic light emitting diode is weak to moisture and oxygen, a high vacuum environment of a chamber is used when laser machining is performed on a substrate (SUB) of an organic light emitting display.

SUMMARY

According to an exemplary embodiment of the present invention, a laser apparatus includes: a first vacuum chamber, wherein machining is performed on a target substrate in the first vacuum chamber; a laser facing the first vacuum chamber; a carrier disposed in the first vacuum chamber, wherein the target substrate is seated on the carrier; a chamber window disposed in one surface of the first vacuum chamber, wherein a laser beam emitted by the laser passes through the chamber window; a first protection window positioned between the carrier and the chamber window; a second vacuum chamber disposed at a first side of the first vacuum chamber; and a transfer unit configured to transfer the first protection window to the second vacuum chamber.

In an exemplary embodiment of the present invention, the first vacuum chamber further includes a process region, wherein machining is performed on the target substrate by the laser beam in the process region; and the first protection window is transferred from the process region to the second vacuum chamber by the transfer unit.

In an exemplary embodiment of the present invention, the transfer unit is positioned between the process region and the second vacuum chamber.

In an exemplary embodiment of the present invention, the laser beam is configured to pass through the chamber window and the first protection window, and is emitted to one surface of the target substrate.

In an exemplary embodiment of the present invention, the laser apparatus further includes a plurality of second protection windows disposed in the second vacuum chamber, wherein a second protection window of the plurality of second protection windows is transferred to the first vacuum chamber by the transfer unit.

In an exemplary embodiment of the present invention, the laser apparatus further includes a cassette disposed in the second vacuum chamber, wherein the second protection window is loaded on the cassette.

In an exemplary embodiment of the present invention, the first protection window and the second protection window each include quartz materials.

In an exemplary embodiment of the present invention, the laser apparatus further includes a chamber door positioned at one side of the second vacuum chamber, wherein the second protection window is configured to exit and enter through the chamber door.

In an exemplary embodiment of the present invention, the laser apparatus further includes a contamination detector configured to detect whether the first protection window is contaminated.

In an exemplary embodiment of the present invention, the laser apparatus further includes a controller configured to control the transfer unit based on a detection signal from the contamination detector.

In an exemplary embodiment of the present invention, the laser apparatus further includes a first gate valve positioned at a second side of the first vacuum chamber, wherein the target substrate is configured to exit and enter through the first gate valve.

In an exemplary embodiment of the present invention, the laser apparatus further includes a second gate valve positioned in the first side of the first vacuum chamber, wherein the first protection window is configured to exit and enter through the second gate valve.

According to an exemplary embodiment of the present invention, a laser machining method includes: arranging a first protection window in a first vacuum chamber, wherein the first vacuum chamber includes a chamber window, and the first protection window overlaps the chamber window; arranging a first target substrate in the first vacuum chamber; emitting a laser beam through the chamber window and the first protection window to perform laser machining on the first target substrate; and transferring the first protection window to a second vacuum chamber disposed at a side of the first vacuum chamber.

In an exemplary embodiment of the present invention, wherein the laser beam is emitted by a laser facing the first vacuum chamber, wherein the laser beam is emitted to one surface of the first target substrate through the chamber window and the first protection window.

In an exemplary embodiment of the present invention, the laser machining method further includes detecting contamination of the first protection window after performing laser machining of the first target substrate.

In an exemplary embodiment of the present invention, the first vacuum chamber further includes a gate valve positioned at a first side thereof, and wherein the first protection window is transferred to the second vacuum chamber through the gate valve.

In an exemplary embodiment of the present invention, the laser machining method further includes transferring a second protection window positioned in the second vacuum chamber to the first vacuum chamber.

In an exemplary embodiment of the present invention, the second protection window is transferred to the first vacuum chamber through the gate valve.

In an exemplary embodiment of the present invention, the laser machining method further includes, after the transferring of the second protection window to the first vacuum chamber, arranging a second target substrate in the first vacuum chamber to overlap the second protection window.

In an exemplary embodiment of the present invention, the laser machining method further includes, emitting the laser beam through the chamber window and the second protection window to perform laser machining on the second target substrate.

BRIEF DESCRIPTION OF THE DRAWINGS

The above and features of the present invention will become more apparent by describing exemplary embodiments thereof in detail with reference to the accompanying drawings, in which:

FIG. 15 is a block diagram of a laser apparatus according to an exemplary embodiment of the present invention.

DETAILED DESCRIPTION OF THE EMBODIMENTS

The present invention will now be described more fully hereinafter with reference to the accompanying drawings, in which exemplary embodiments of the present invention are shown. This invention may, however, be embodied in different forms and should not be construed as limited to the exemplary embodiments set forth herein.

It will also be understood that when a layer or element is referred to as being "on" another layer, element or substrate, it can be directly on the other layer, element or substrate, or intervening layers or elements may be present therebetween.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example terms "below" and "beneath" can encompass both an orientation of above, below and beneath. The device may be otherwise oriented (e.g., rotated 90 degrees or at other orientations) and the spatially relative descriptors used herein may be interpreted accordingly.

The same reference numbers may indicate the same components throughout the specification, and thus, their descriptions may be omitted.

Hereinafter, exemplary embodiments of the present invention will be described with reference to the accompanying drawings. In the specification, a first direction DR1 denotes a Z-axis direction, and a second direction DR2 denotes a direction crossing the first direction DR1. For example, the second direction DR2 may be an X-axis direction or a Y-axis direction.

Figure 1:
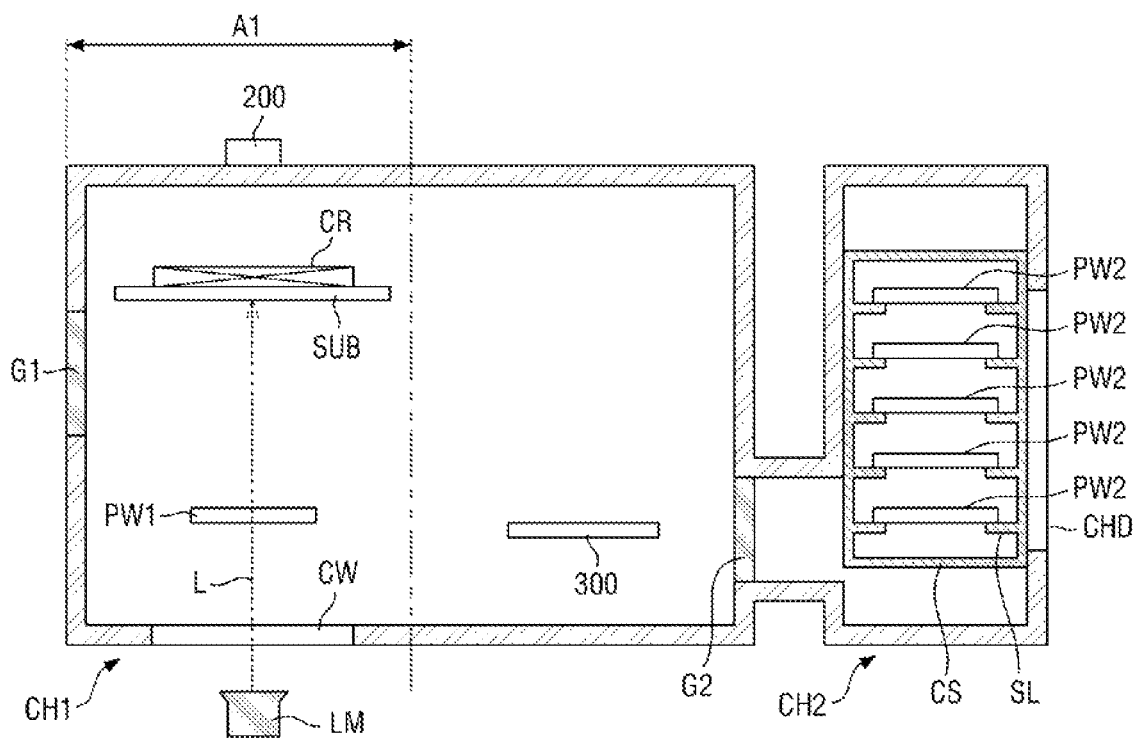
FIG. 1 is a view illustrating a laser apparatus according to an exemplary embodiment of the present invention.

FIG. 1 is a view illustrating a laser apparatus according to an exemplary embodiment of the present invention.

Referring to FIG. 1, the laser apparatus according to an exemplary embodiment of the present invention may include a first vacuum chamber CH1, a carrier CR, a laser module LM, a chamber window CW, a first protection window PW1, a contamination detector 200, a transfer unit 300, a second vacuum chamber CH2, a cassette CS, and second protection windows PW2.

The first vacuum chamber CH1 may be a space in which an etching or drilling process is performed on a substrate SUB. The first vacuum chamber CH1 may include a process region A1 in which laser machining is performed on the substrate SUB.

The substrate SUB is a target object of the laser apparatus according to an exemplary embodiment of the present invention and may be any kind of substrate of, for example, an organic light emitting display, a micro light emitting diode display, a quantum dot light emitting display, or an inorganic light emitting display. The organic light emitting display may use an organic light emitting diode including an organic light emitting layer. The micro light emitting diode display may use a micro light emitting diode (micro LED). The quantum dot light emitting display may use a quantum dot LED including a quantum dot light emitting layer, and the inorganic light emitting display may use an inorganic LED including an inorganic semiconductor. The following substrate SUB will be described as a substrate of the organic light emitting display.

In FIG. 1, a portion of the first vacuum chamber CH1 is schematically illustrated. For example, the first vacuum chamber CH1 may be maintained in a vacuum state by a vacuum pump and a vacuum valve.

A first gate valve G1 may be disposed at one side of the first vacuum chamber CH1. The substrate SUB may be provided into the first vacuum chamber CH1 through the first gate valve G1. For example, the first gate valve G1 may provide a path through which the substrate SUB exits and enters.

A second gate valve G2 may be disposed at the other side of the first vacuum chamber CH1. For example, the first and second gate valves G1 and G2 may be disposed at opposing sides. The protection windows PW1 and PW2, which will be described below, may be transferred through the second gate valve G2.

The carrier CR may be disposed in the first vacuum chamber CH1. The carrier CR may adsorb and move the substrate SUB and include an electrostatic chuck for adsorbing the substrate SUB.

The laser module LM may be disposed outside the first vacuum chamber CH1. The laser module LM may be disposed to overlap the process region A1 of the first vacuum chamber CH1.

The laser module LM (e.g., a laser) emits a laser beam L to one surface of the substrate SUB to perform machining on the substrate SUB. The laser beam L emitted by the laser module LM passes through the chamber window CW and the first protection window PW1 and is emitted to the substrate SUB, and thus an etching or drilling process may be performed. The laser module LM may include a laser unit, a lens, a mirror, a beam expander, a filter, a scanner, and/or the like.

The chamber window CW may be disposed at a lower side of the first vacuum chamber CH1. For example, the chamber window CW may be disposed in a lower surface of the first vacuum chamber CH1. The chamber window CW may be disposed to overlap the process region A1 of the first vacuum chamber CH1.

The chamber window CW may be formed of a transparent material capable of transmitting the laser beam L emitted by the laser module LM. The laser beam L emitted by the laser module LM disposed outside the first vacuum chamber CH1 may enter the first vacuum chamber CH1 through the chamber window CW.

The chamber window CW may be disposed between the laser module LM and the carrier CR (or, for example, the substrate SUB). For example, the chamber window CW may be disposed to overlap the laser module LM and the carrier CR (or, for example, the substrate SUB). For example, the laser module LM, the chamber window CW, the first protection window PW1, and the carrier CR may overlap each other.

The chamber window CW may be formed of, for example, a quartz material. In FIG. 1, a case in which the chamber window CW includes one window is illustrated, but the present invention is not limited thereto. For example, the chamber window CW may include a plurality of windows corresponding to the number of laser modules LM.

The chamber window CW may have, for example, a quadrilateral shape when viewed from above. However, the present invention is not limited thereto. For example, the chamber window CW may have a circular shape when viewed from above.

The first protection window PW1 may be disposed above the chamber window CW in the first vacuum chamber CH1. The first protection window PW1 may be disposed in the process region A1 of the first vacuum chamber CH1. In addition, the first protection window PW1 may be disposed between the carrier CR (or, e.g., the substrate SUB) and the chamber window CW. For example, the first protection window PW1 may be disposed to overlap the carrier CR (or, e.g., the substrate SUB) and the chamber window CW.

The first protection window PW1 may be formed of a transparent material capable of transmitting the laser beam L which has entered the first vacuum chamber CH1 through the chamber window CW. For example, the first protection window PW1 may be formed of the quartz material and may be formed of the same material as the chamber window CW.

The first protection window PW1 may allow the laser beam L to pass therethrough and prevent the chamber window CW from being contaminated by particles P delaminated and/or detached from the substrate SUB while a laser machining process is performed. Accordingly, since degradation of a refractive index or transmittance due to the particles P, from the substrate SUB, on the chamber window CW can be prevented, machining quality can be increased. In addition, since replacement or cleaning of the chamber window CW is not being performed and a time period for opening the first vacuum chamber CH1 to replace the chamber window CW may not be increased, production efficiency of the laser apparatus can be increased.

In FIG. 1, a case in which the first protection window PW1 includes one window is illustrated, but the present invention is not limited thereto. For example, the first protection window PW1 may also include a plurality of windows corresponding to the number of laser modules LM. The first protection window PW1 may have, for example, a quadrilateral or circular shape when viewed from above. In addition, the planar shape of the first protection window PW1 may substantially match with the planar shape of the chamber window CW, but the present invention is not limited thereto.

The contamination detector 200 may be disposed on the first vacuum chamber CH1. The contamination detector 200 may detect an accumulated amount of the particles P accumulated on the first protection window PW1 to detect a contamination level of the first protection window PW1.

The contamination detector 200 may be disposed to overlap the process region A1 of the first vacuum chamber CH1. In addition, the contamination detector 200 may be disposed to overlap the first protection window PW1. In FIG. 1, a case in which the contamination detector 200 is disposed outside the first vacuum chamber CH1 is illustrated, but the contamination detector 200 may be positioned at any position from which the contamination detector 200 may detect an accumulated amount of the particles P accumulated on the first protection window PW1 and the like. For example, the contamination detector 200 may be disposed inside of the first vacuum chamber CH1.

The transfer unit 300 may be disposed in the first vacuum chamber CH1. For example, the transfer unit 300 may be disposed in a region except for the process region A1 of the first vacuum chamber CH1. However, the present invention is not limited thereto, and the transfer unit 300 may reciprocate in the first vacuum chamber CH1 and partially overlap the process region A1. The transfer unit 300 may be connected to an external power source and may laterally reciprocate in the first vacuum chamber CH1. For example, the transfer unit 300 may include a tray and/or a plate, an actuator, and a motor.

The transfer unit 300 may serve to transfer the above-described first protection window PW1 and the second protection windows PW2 which will be described below. The first protection window PW1 and the second protection window PW2 may be transferred from the first vacuum chamber CH1 to the second vacuum chamber CH2, or from the second vacuum chamber CH2 to the first vacuum chamber CH1, by the transfer unit 300.

The second vacuum chamber CH2 may be a space in which the second protection windows PW2 are stored. In FIG. 1, a portion of the second vacuum chamber CH2 is schematically illustrated. The second vacuum chamber CH2 may be maintained in a vacuum state by a vacuum pump and a vacuum valve. The second vacuum chamber CH2 may have any form as long as the second protection windows PW2 may be stored therein. For example, the second vacuum chamber CH2 may have a quadrangular shape, such as a rectangular shape. As an additional example, the second vacuum chamber CH2 may be disposed at one side of the first vacuum chamber CH1.

A chamber door CHD may be disposed at one side of the second vacuum chamber CH2. Inventory of the protection windows PW1 and PW2 may be managed independently of the first vacuum chamber CH1, for example, the protection windows PW1 and PW2 are cleaned or replaced with new protection windows through the chamber door CHD.

The cassette CS may be disposed in the second vacuum chamber CH2. The cassette CS may be fixed in the second vacuum chamber CH2. In addition, the cassette CS may be lifted or lowered by a separate lift and may also be loaded into the second vacuum chamber CH2 from the outside or unloaded to the outside. The cassette CS may include a plurality of supports (e.g., support walls) and a plurality of slots SL which protrude from the supports.

The plurality of slots SL may be positioned to face each other. The slots SL may support the second protection windows PW2 and provide a space in which the second protection windows PW2 are loaded. In FIG. 1, a case in which the cassette CS includes a total of five pairs of slots SL is illustrated, but the number of the slots SL of the cassette CS is not limited thereto.

The second protection windows PW2 may be positioned in the second vacuum chamber CH2. For example, the second protection windows PW2 may be loaded on the slots SL of the cassette CS.

Since the second protection windows PW2 are protection windows for replacement, in a case in which the first protection window PW1 is contaminated, the first protection window PW1 may be replaced with the second protection window PW2. Accordingly, since degradation of a refractive index or transmittance due to particles P of the first protection window PW1 can be prevented, machining quality can be increased. In addition, since a process in which the chamber is opened to replace or clean the first protection window PW1 is not being performed, production efficiency of the laser apparatus can be increased.

In addition, even when the protection window is replaced, the second vacuum chamber CH2 may be maintained in a vacuum state by the vacuum pump and the vacuum valve. Accordingly, even when the second gate valve G2 is opened to transfer the second protection window PW2, a degree of vacuum of the first vacuum chamber CH1 may not be affected. For example, when the first protection window PW1 is contaminated, the first protection window PW1 may be replaced with the second protection window PW2 while a high vacuum environment of the first vacuum chamber CH1 is maintained. Accordingly, laser machining can be continuously performed in a high vacuum environment without opening the chamber.

In addition, since the laser machining can be performed in the high vacuum environment, penetration of moisture or oxygen into an LED of the substrate SUB can be minimized. Accordingly, reliability of the substrate SUB, for example, component reliability of a display, can be increased.

In addition, since the second protection windows PW2 may be managed for a long time in the second vacuum chamber CH2 independently of the first vacuum chamber CH1 in which laser machining is performed, the laser apparatus may be operated for a long time without opening the first vacuum chamber CH1. Accordingly, production efficiency of the laser apparatus can be increased.

The second protection window PW2 may be formed of the same material as the first protection window PW1. For example, the second protection window PW2 may be formed of a transparent material capable of transmitting a laser beam L. For example, the second protection window PW2 may be formed of a quartz material.

The second protection window PW2 may have substantially the same planar shape as the first protection window PW1. For example, the second protection window PW2 may have a quadrilateral or circular shape when viewed from above.

In FIG. 1, a case in which five second protection windows PW2 are stored in the second vacuum chamber CH2 is illustrated, but the number of the second protection windows PW2 is not limited thereto. For example, inventory management for the second protection window PW2 may be changed according to a time period of the laser machining process, the number of the laser machining processes performed or to be performed, and a contamination period of the protection window.

As described above, in the laser apparatus according to an exemplary embodiment of the present invention, when the first protection window PW1 is contaminated, the first protection window PW1 may be replaced with the second protection window PW2 while a high vacuum environment of the first vacuum chamber CH1 is maintained. Accordingly, since the laser machining can continuously be performed in the high vacuum environment without opening the chamber, production efficiency of the laser apparatus can be increased.

In addition, since the laser machining can be performed in the high vacuum environment, penetration of moisture or oxygen into the LED of the substrate SUB can be minimized. Accordingly, reliability of the substrate SUB, for example, component reliability of the display can be increased.

Next, a laser machining method of the laser apparatus according to an exemplary embodiment of the present invention will be described. The components which are substantially the same as those in FIG. 1 will be denoted by the same numerals and the detailed descriptions thereof may be omitted.

FIGS. 2 to 6 are structural views for describing process operations of a machining method of the laser apparatus according to an exemplary embodiment of the present invention.

Figure 2:
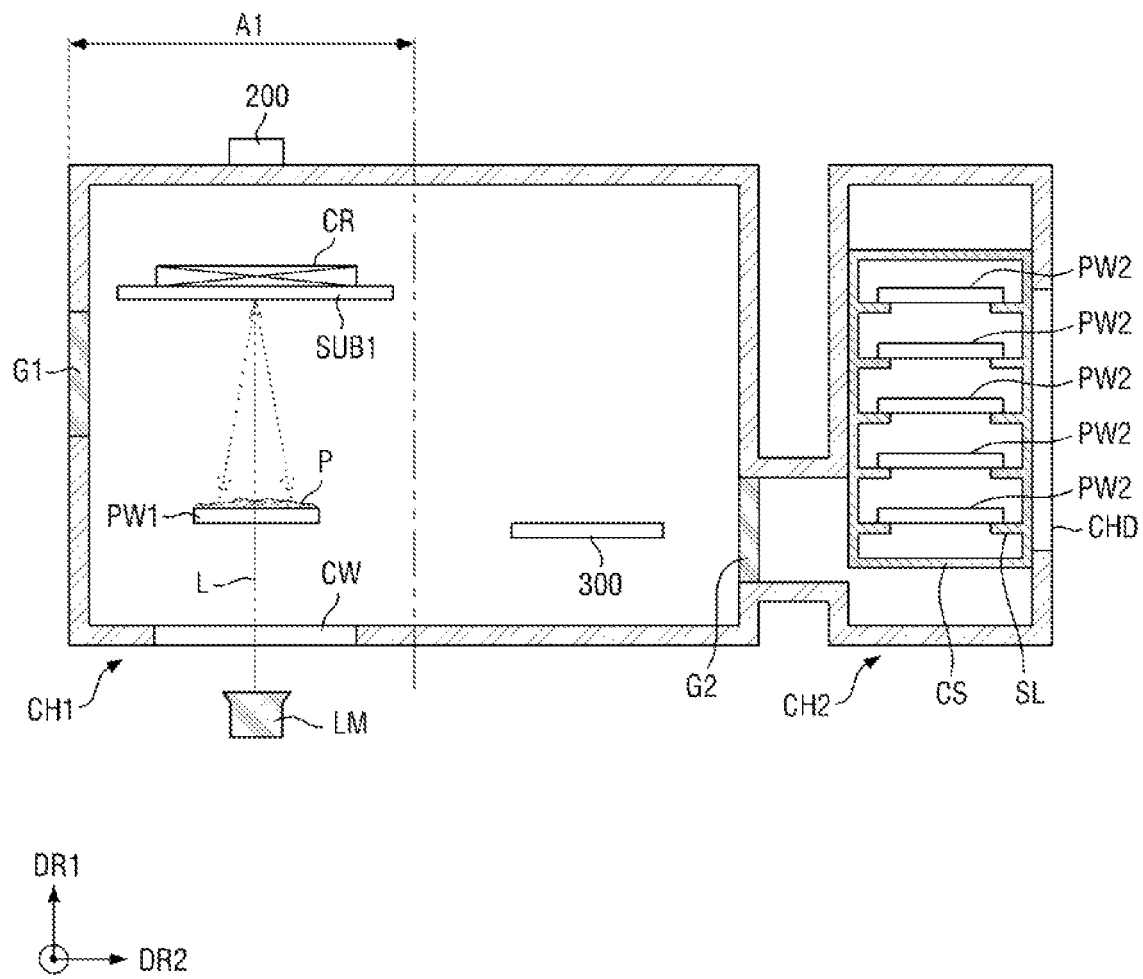
FIGS. 2, 3, 4, 5 and 6 are views for describing process operations of a machining method of a laser apparatus according to an exemplary embodiment of the present invention.

Referring to FIG. 2, laser machining is performed on a first substrate SUB1. The laser module LM may emit a laser beam L on one surface of the first substrate SUB1 to perform the machining on the first substrate SUB1. Here, the machining may include an etching or drilling process. The first substrate SUB1 may be substantially the same as the substrate SUB illustrated with reference to FIG. 1.

The laser beam L emitted by the laser module LM may pass through the chamber window CW and enter the first vacuum chamber CH1. The light, which has passed through the chamber window CW, may pass through the first protection window PW1 and be emitted on one surface of the first substrate SUB1.

As an etching or drilling process is performed on the first substrate SUB1, particles P delaminated from the first substrate SUB1 may descend toward the first protection window PW1 and be accumulated on one surface of the first protection window PW1. In this case, a refractive index of the first protection window PW1 and a transmittance of the laser beam L may be degraded due to the particles P, and thus quality of the laser machining may be degraded.

Figure 3:
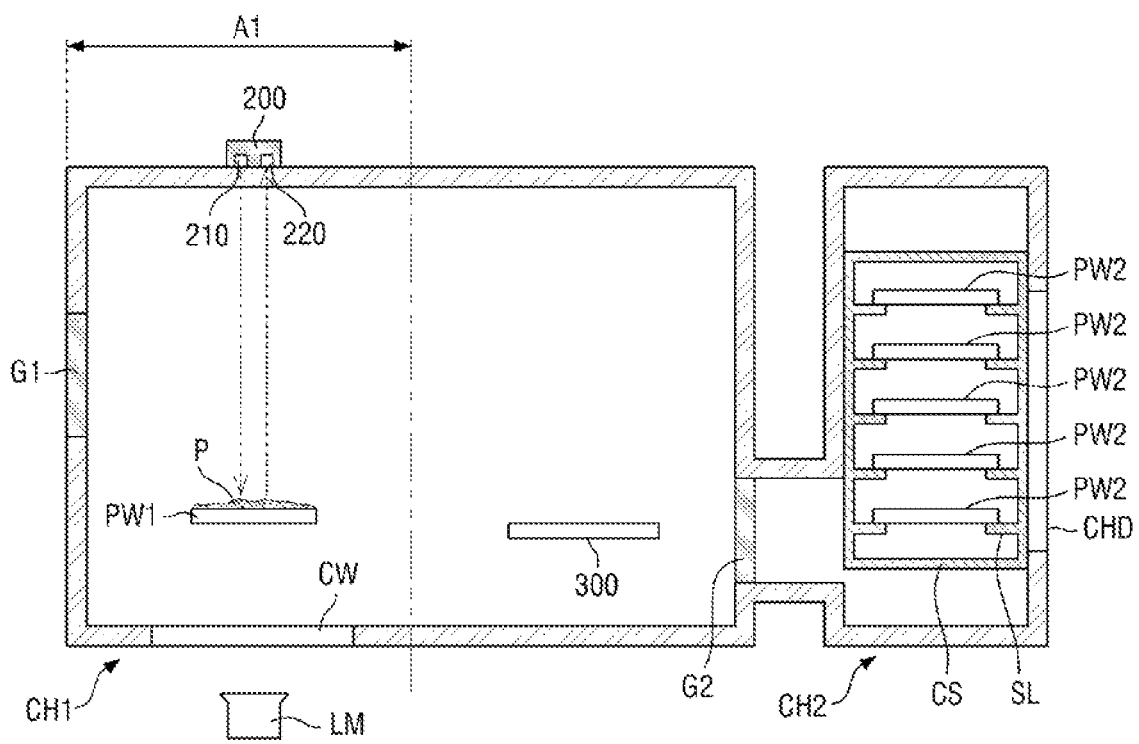

Then, referring to FIG. 3, contamination of the first protection window PW1 is detected by the contamination detector 200. The contamination detector 200 may detect an accumulated amount of the particles P that is accumulated on the first protection window PW1 and detect whether the first protection window PW1 is contaminated.

The contamination detector 200 includes a light emitter 210 and a light receiver 220. The light emitter 210 emits light on one surface of the first protection window PW1, the light receiver 220 receives light reflected by the first protection window PW1, and thus, the contamination detector 200 may detect an accumulated amount of the particles P accumulated on the first protection window PW1.

The contamination detector 200 may automatically detect contamination of the first protection window PW1 at a predetermined time period. Here, the detection period of the contamination detector 200 may be set by considering a time period of the laser machining process and the number of the laser machining processes to be performed.

The detection period of the contamination detector 200 may match a replacement period of the first substrate SUB1. Detecting contamination of the first protection window PW1 may be performed at a time point at which the laser machining performed on the first substrate SUB1 is finished. For example, the detecting of the contamination of the first protection window PW1 may be performed in a state in which the first substrate SUB1 is unloaded from the process region A1 of the first vacuum chamber CH1 by the carrier CR.

In addition, the first substrate SUB1 may include a plurality of substrates, and in this case, a replacement time point of the first substrate SUB1 may be a time point at which machining performed on the plurality of substrates is finished.

Figure 4:
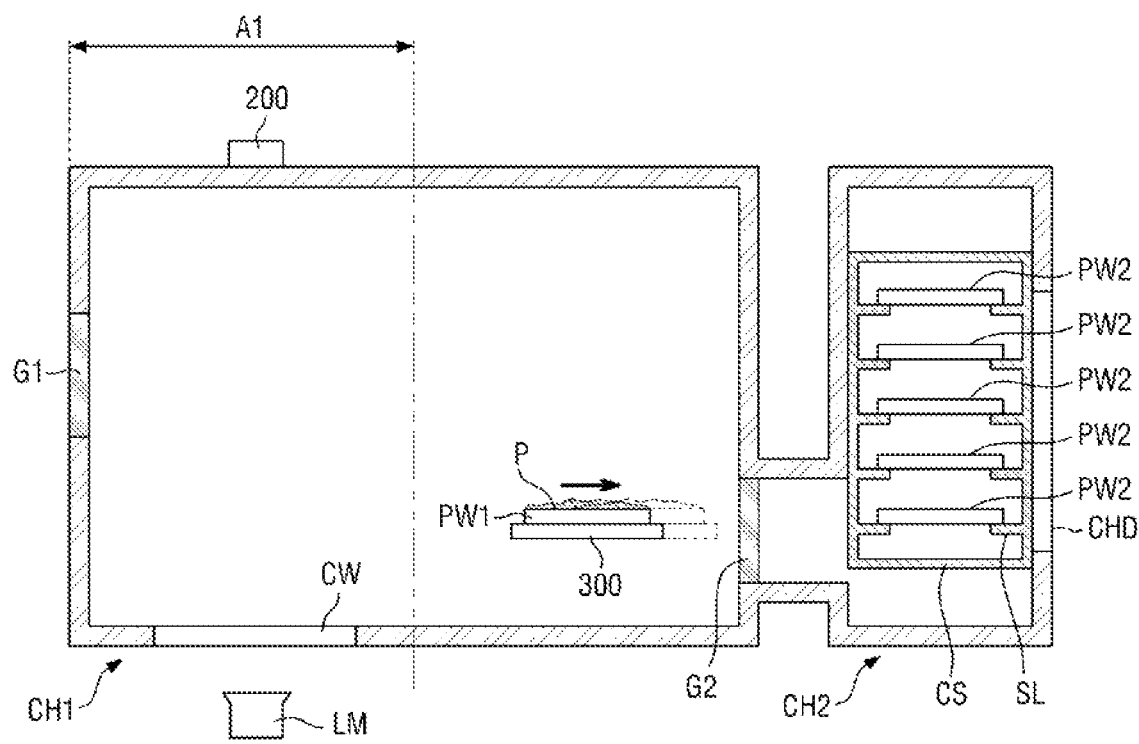
Figure 4:
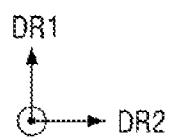
Figure 5:
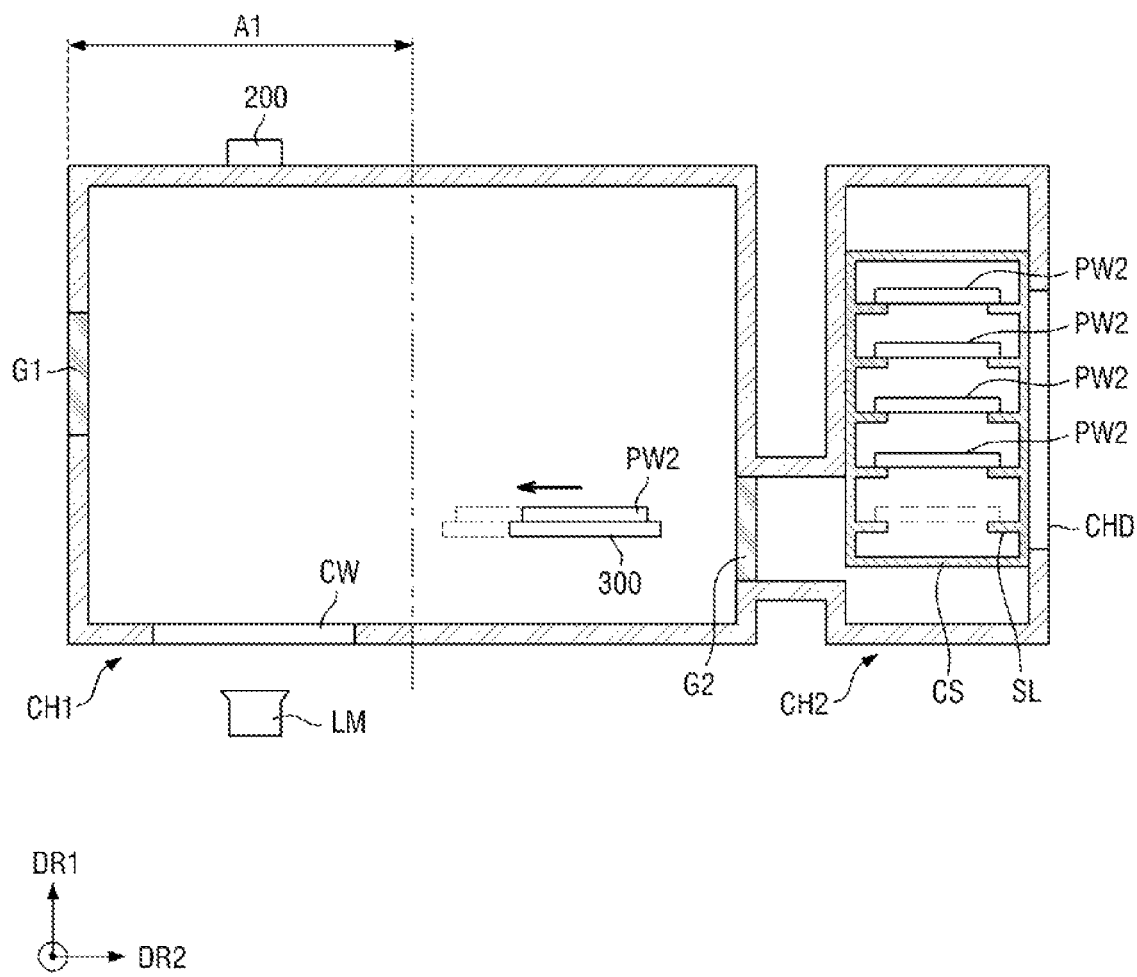

Referring to FIGS. 4 and 5, in a case in which a contamination level of the first protection window PW1 reaches a critical value, the contaminated first protection window PW1 may be automatically transferred to the outside of the process region A1 (e.g., a region adjacent to the process region A1) of the first vacuum chamber CH1 by the transfer unit 300. The first protection window PW1 may be transferred to the second vacuum chamber CH2 by the transfer unit 300. Here, the first protection window PW1 may be transferred to the second vacuum chamber CH2 through the second gate valve G2.

In addition, the second protection window PW2 stored in the second vacuum chamber CH2 is transferred to the process region A1 of the first vacuum chamber CH1 by the transfer unit 300. For example, the transfer unit 300 may replace the contaminated first protection window PW1 with the second protection window PW2. Further, the transfer unit 300 may move the first protection window PW1 out of the process region A1 and may move the second protection window PW2 into the process region A1. The second protection window PW2 may be transferred to the first vacuum chamber CH1 through the second gate valve G2.

As described above, even when the protection window (e.g., the first protection window PW1) is replaced, the second vacuum chamber CH2 may be maintained in a vacuum state by the vacuum pump and the vacuum valve. Accordingly, even when the second gate valve G2 is opened to transfer the second protection window PW2, a degree of vacuum of the first vacuum chamber CH1 may not be affected. For example, when the first protection window PW1 is contaminated, the first protection window PW1 may be replaced with the second protection window PW2 while a high vacuum environment of the first vacuum chamber CH1 is maintained. Accordingly, laser machining can be performed in a high vacuum environment without opening the chamber.

In FIGS. 4 and 5, a case in which the first protection window PW1 is transferred first and the second protection window PW2 is transferred thereafter is illustrated, but the present invention is not limited thereto. For example, after the second protection window PW2 is transferred to the process region A1 of the first vacuum chamber CH1, the first protection window PW1 may also be unloaded, or the first protection window PW1 and the second protection window PW2 may be simultaneously transferred to be replaced with each other. For example, there may be two transfer units 300.

Figure 6:
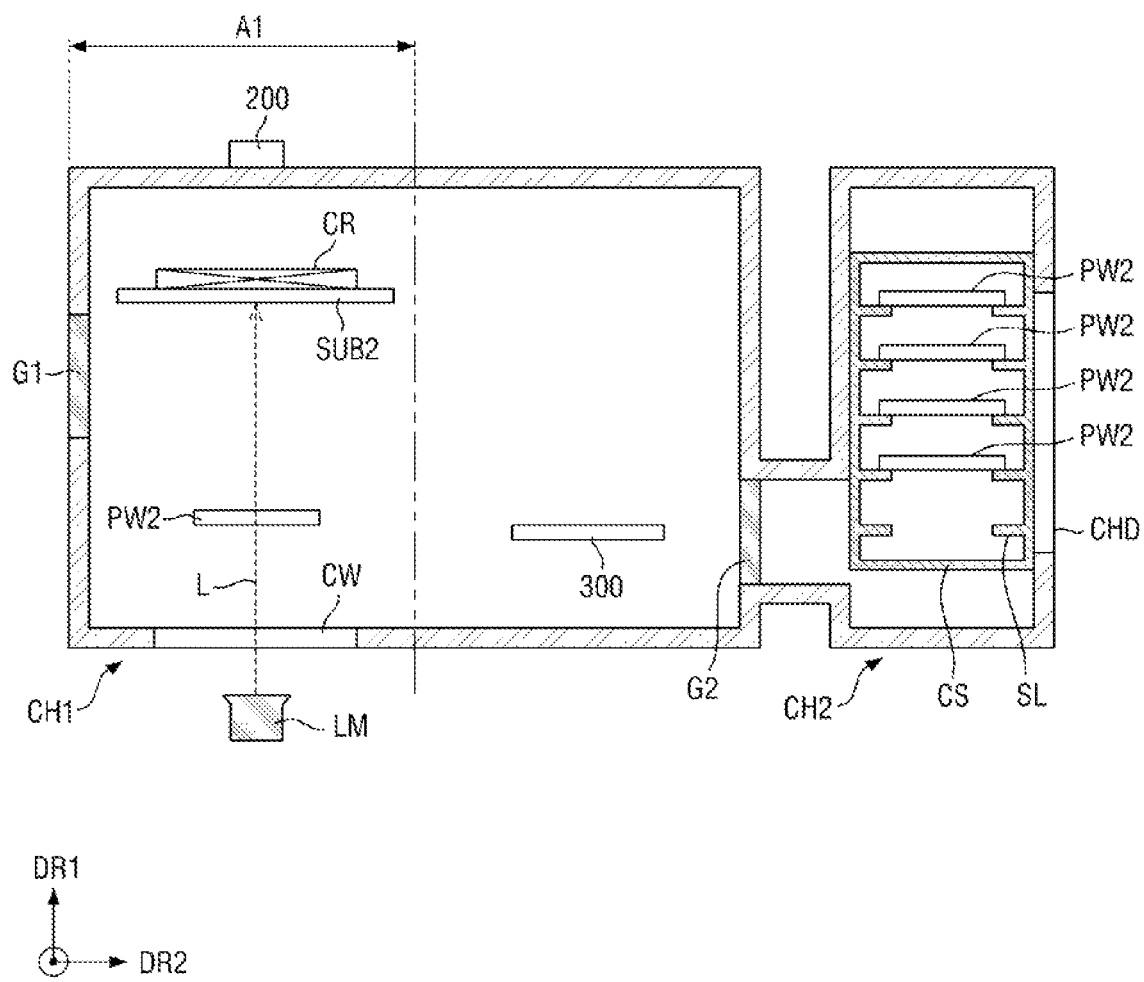

Referring to FIG. 6, laser machining is performed on a second substrate SUB2. The laser module LM may emit a laser beam L on one surface of the second substrate SUB2 to perform the machining on the second substrate SUB2. The second substrate SUB2 may be substantially the same as the first substrate SUB1 described with reference to FIG. 2.

The laser beam L emitted by the laser module LM may pass through the chamber window CW and enter the first vacuum chamber CH1. The light, which has passed through the chamber window CW, may be emitted on one surface of the second substrate SUB2 through the second protection window PW2.

As described above, the laser machining method according to an exemplary embodiment of the present invention may include detecting contamination of the first protection window PW1 using the contamination detector 200 and automatically replacing the first protection window PW1 with the second protection window PW2 while a high vacuum environment of the first vacuum chamber CH1 is maintained. Accordingly, since the laser machining can be continuously performed in the high vacuum environment without opening the chamber, production efficiency of the laser apparatus can be increased.

In addition, since the laser machining can be performed in the high vacuum environment, penetration of moisture or oxygen into an LED of the substrate SUB can be minimized. Accordingly, reliability of the second substrate SUB2, that is, component reliability of a display, can be increased.

Figure 7:
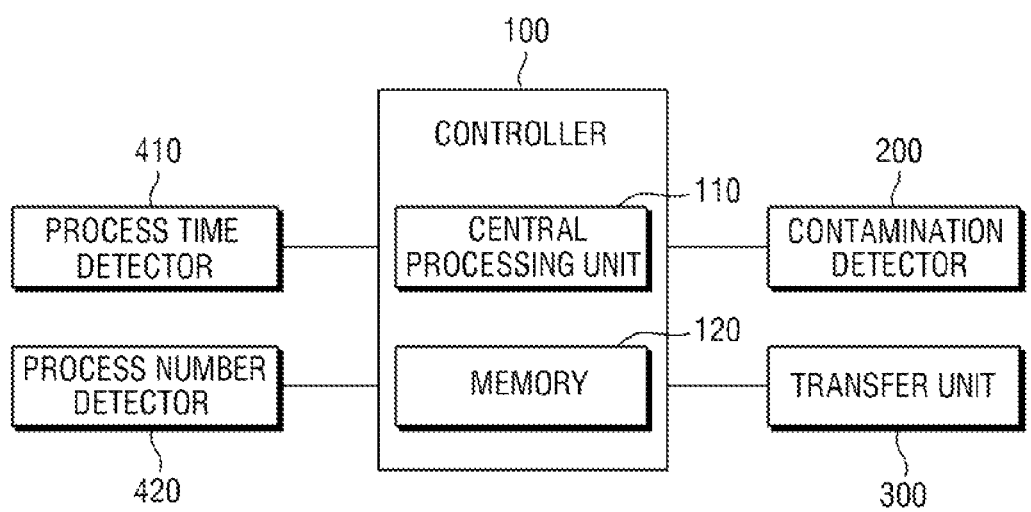
FIG. 7 is a block diagram of a laser apparatus according to an exemplary embodiment of the present invention.

FIG. 7 is a control block diagram of the laser apparatus according to an exemplary embodiment of the present invention.

Referring to FIG. 7, the laser apparatus according to an exemplary embodiment of the present invention may further include a controller 100 configured to control operation of the transfer unit 300. The transfer unit 300 may be operated by the controller 100 to transfer the first protection window PW1 or the second protection window PW2. In this case, the controller 100 receives a signal to control the operation of the transfer unit 300, and the signal may be provided by at least one of a contamination detector 200, a process time detector 410, and/or a process number detector 420.

The contamination detector 200 detects an accumulated amount of particles P accumulated on the first protection window PW1 and transmits information thereof to the controller 100.

The process time detector 410 detects an etching and/or drilling process time period for each substrate SUB and transmits information thereof to the controller 100.

The process number detector 420 detects the number of etching and/or drilling processes performed on the substrates SUB and transmits information thereof to the controller 100.

In FIG. 7, a case in which all of the contamination detector 200, the process time detector 410, and the process number detector 420 are used, is illustrated, but the present invention is not limited thereto. For example, at least one among the contamination detector 200, the process time detector 410, and/or the process number detector 420 may be used. For example, the controller 100 may receive information from the contamination detector 200, the process time detector 410, or the process number detector 420, and may control the transfer unit 300 to automatically replace the protection windows PW1 and PW2 with each other.

The controller 100 may include a central processing unit 110 and a memory 120.

The central processing unit 110 may be one of various computer processors capable of being industrially applied for controlling the transfer unit 300 to transfer the protection windows PW1 and PW2 after receiving information from the contamination detector 200, the process time detector 410, and/or the process number detector 420.

The memory 120 may be connected to the central processing unit 110. The memory 120 is a computer readable recording medium and may be installed at a local or remote site. For example, the memory 120 may be one of a random access memory (RAM), a read only memory (ROM), a floppy disc, a hard disc, and/or any digital storage medium.

The controller 100 may receive the information from the contamination detector 200, the process time detector 410, and/or the process number detector 420 and control the transfer unit 300 to transfer the protection windows PW1 and PW2. In this case, a series of processes and the like may be stored in the memory 120. For example, the series of processes may include the controller 100 receiving the information from the contamination detector 200, the process time detector 410, and/or the process number detector 420, and controlling the transfer unit 300 to transfer the protection windows PW1 and PW2. In addition, a software routine may be stored in the memory 120. The software routine may be stored or executed by another central processing unit.

In addition, although it is described that the process operations of the controller 100 are performed by the software routine, at least some of the process operations may also be performed by hardware. For example, the processes may be realized through software executed on a computer system or may also be realized through hardware such as an integrated circuit. In addition, the processes may be realized through a combination of software and hardware.

Hereinafter, an exemplary embodiment of the present invention will be described. The same components as the above-described components will be denoted as the same numerals in the following exemplary embodiment of the present invention, and the repetitive description may be omitted or simplified.

FIGS. 8 to 14 are views for describing process operations of a machining method of a laser apparatus according to an exemplary embodiment of the present invention.

Figure 8:
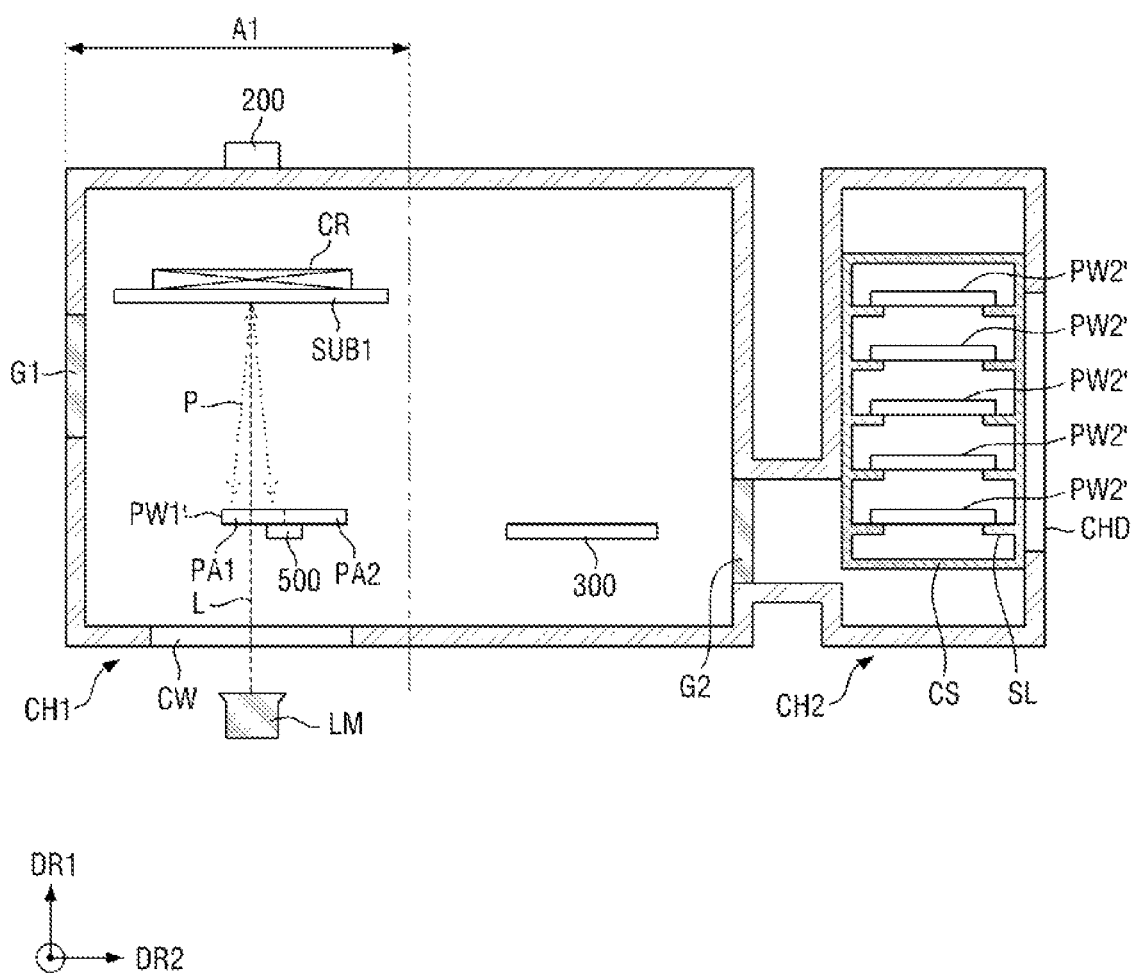
FIGS. 8, 9, 10, 11, 12, 13, and 14 are views for describing process operations of a machining method of a laser apparatus according to an exemplary embodiment of the present invention.

Referring to FIG. 8, a laser apparatus according to the present embodiment differs from that in the embodiment of FIGS. 1 to 7 in that a first protection window PW1' includes a first region PA1 and a second region PA2, and the laser apparatus, according to the present embodiment, further includes a protection window moving module 500 configured to transfer the first protection window PW1'.

The first region PA1 of the first protection window PW1' may be positioned at one side of a center of the first protection window PW1' and the second region PA2 may be positioned at the other side of the center of the first protection window PW1'. For example, one portion of the first protection window PW1' may be the first region PA1, and another portion of the first protection window PW1' may be the second region PA2.

The first region PA1 and/or the second region PA2 of the first protection window PW1' may be disposed in a process region A1 of a first vacuum chamber CH1. In addition, the first region PA1 and/or the second region PA2 of the first protection window PW1' may be disposed above a chamber window CW and overlap a laser module LM. Accordingly, the first region PA1 and/or the second region PA2 of the first protection window PW1' may allow a laser beam L to pass therethrough and may prevent contamination of the chamber window CW due to particles P delaminated and detached from a target substrate (e.g., SUB1) while a laser machining process is performed. Accordingly, degradation of a refractive index or a transmittance of the chamber window CW due to the particles P may be prevented and production efficiency of the laser apparatus can be increased as described above.

The first region PA1 and/or the second region PA2 of the first protection window PW1' reciprocates in the first vacuum chamber CH1 by the protection window moving module 500 which partially overlaps the first region PA1 and the second region PA2. For example, the protection window moving module 500 may move the first protection window PW1' such that the first region PA1 and/or the second region PA2 is positioned within a range in which the particles P are accumulated on the first protection window PW1'. For example, the moving module 500 may include an actuator and a motor.

For example, when laser machining is performed on a first substrate SUB1, the first region PA1 of the first protection window PW1' may overlap the chamber window CW and a region in which a laser beam L is emitted. In this case, the protection window moving module 500 may move the first protection window PW1' a predetermined distance from a center of the laser module LM in a second direction DR2. For example, the first region PA1 of the first protection window PW1' may be provided in a path of the laser beam L emitted from the laser module LM, and the protection window moving module 500 may not be in the path of the laser beam L.

The laser beam L emitted by the laser module LM may pass through the chamber window CW and enter the first vacuum chamber CH1. The light, which has passed through the chamber window CW may be emitted on one surface of the first substrate SUB1 through the first protection window PW1'.

As an etching or drilling process is performed on the first substrate SUB1, particles P delaminated from the first substrate SUB1 may descend toward the first region PA1 of the first protection window PW1' and be accumulated on one surface of the first region PA1 of the first protection window PW1'.

Since the laser module LM and the chamber window CW in addition thereto have been described with reference to FIGS. 1 to 7, the repeating descriptions thereof will be omitted.

Figure 9:
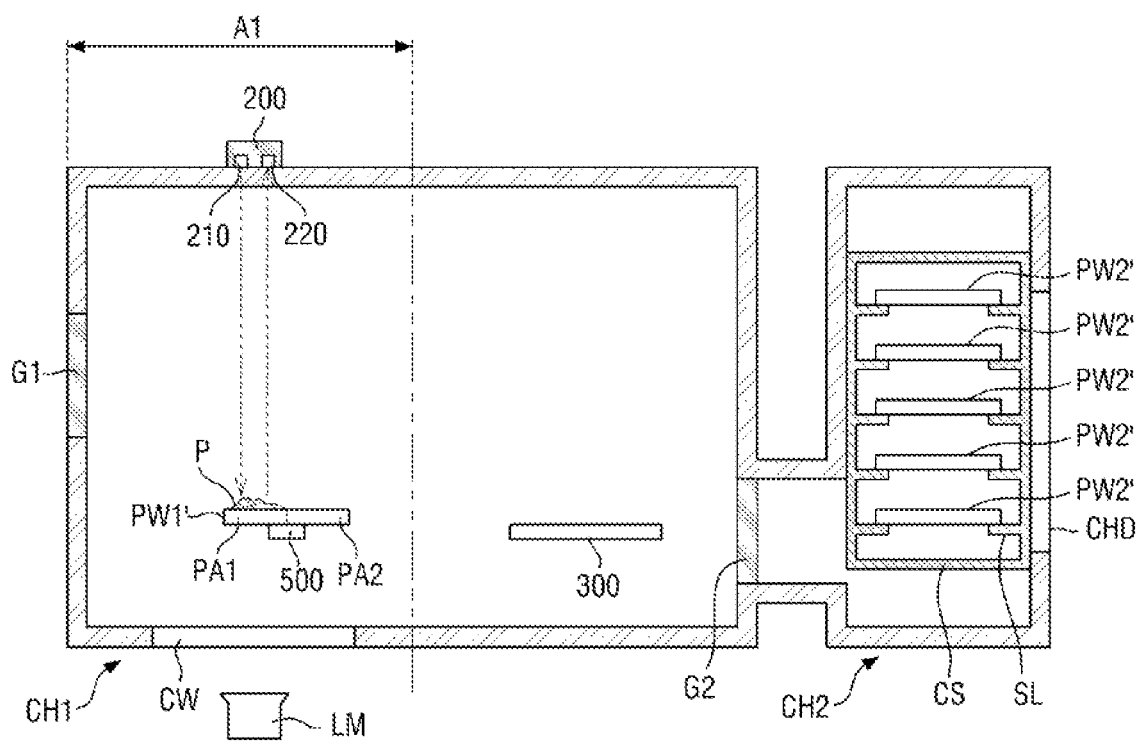

Referring to FIG. 9, contamination of the first region PA1 of the first protection window PW1' is detected by a contamination detector 200. The contamination detector 200 may detect an accumulated amount of the particles P accumulated on the first region PA1 of the first protection window PW1' to detect whether the first region PA1 of the first protection window PW1' is contaminated.

The contamination detector 200 includes a light emitter 210 and a light receiver 220. The light emitter 210 emits light on one surface of the first region PA1 of the first protection window PW1'. The light receiver 220 receives light reflected from the first region PA1 of the first protection window PW1'. Thus, the contamination detector 200 may detect an accumulated amount of the particles P accumulated on the first region PA1 of the first protection window PW1'.

The contamination detector 200 may automatically detect contamination of the first region PA1 of the first protection window PW1' at a predetermined time period. Here, the detection period of the contamination detector 200 may be set by considering a time period of the laser machining process and the number of the laser machining processes.

The detection period of the contamination detector 200 may match a replacement period of the first substrate SUB1. Detecting contamination of the first region PA1 of the first protection window PW1' may be performed at a time point at which the laser machining performed on the first substrate SUB1 is finished. For example, the detecting of the contamination of the first region PA1 of the first protection window PW1' may be performed in a state in which the first substrate SUB1 is unloaded from the process region A1 of the first vacuum chamber CH1 by a carrier CR.

In addition, the first substrate SUB1 may include a plurality of substrates, and in this case, a replacement time point of the first substrate SUB1 may be a time point at which machining performed on the plurality of substrates is finished.

Figure 10:
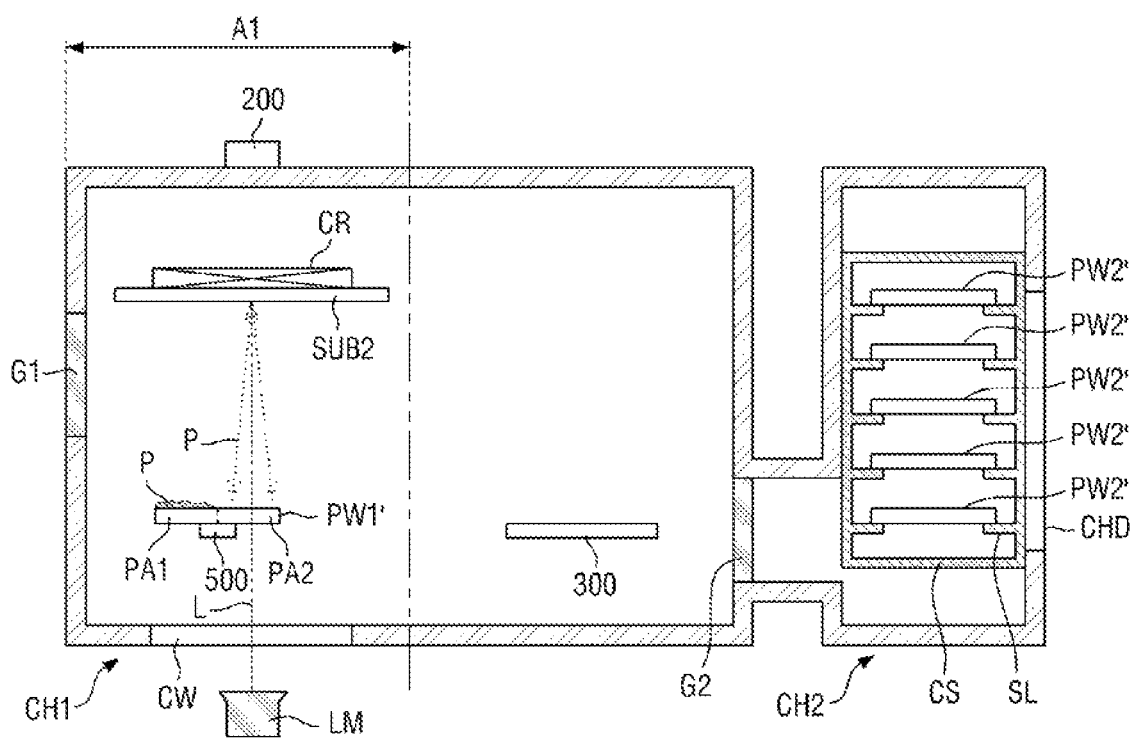

Referring to FIG. 10, in a case in which a contamination level of the first protection window PW1' reaches a predetermined threshold (e.g., a critical value), the first protection window PW1' is moved a predetermined distance by the protection window moving module 500. Here, since the protection window moving module 500 moves the first region PA1 of the first protection window PW1' from the center of the laser module LM in a direction opposite to the second direction DR2, the second region PA2 of the first protection window PW1' may be disposed to overlap a region at which the laser beam L is emitted. For example, the first region PA1 of the first protection window PW1' may be moved out of a path of the laser beam L by the protection window moving module 500, and the second region PA2 of the first protection window PW1' may be moved into the path of the laser beam L by the protection window moving module 500.

Accordingly, the laser machining can be continuously performed using the second region PA2 rather than the contaminated first region PA1 in a region of the first protection window PW1'. For example, since a time period of replacement of the first protection window PW1' can be increased, production efficiency of the laser apparatus can be increased.

After the first protection window PW1' is moved, laser machining is performed on a second substrate SUB2. A laser beam L emitted by the laser module LM may pass through the chamber window CW and enter the first vacuum chamber CH1. The light, which has passed through the chamber window CW, may pass through the second region PA2 of the first protection window PW1' and be emitted onto one surface of the second substrate SUB2.

As an etching or drilling process is performed on the second substrate SUB2, particles P delaminated from the second substrate SUB2 may descend toward the second region PA2 of the first protection window PW1' and be accumulated on one surface of the second region PA2 of the first protection window PW1'.

Figure 11:
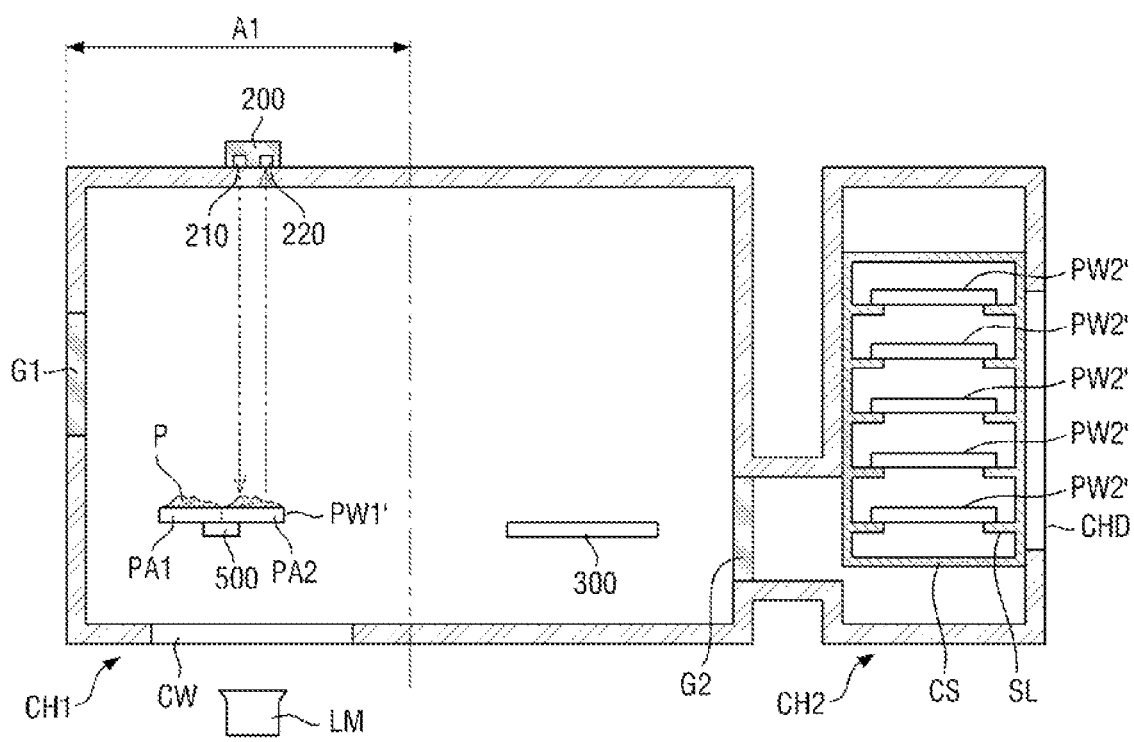

Referring to FIG. 11, contamination of the second region PA2 of the first protection window PW1' is detected by the contamination detector 200. The contamination detector 200 may detect an accumulated amount of the particles P accumulated on the second region PA2 of the first protection window PW1' to detected whether the second region PA2 of the first protection window PW1' is contaminated.

The contamination detector 200 includes the light emitter 210 and the light receiver 220. The light emitter 210 emits light on one surface of the second region PA2 of the first protection window PW1'. The light receiver 220 receives light reflected from the second region PA2 of the first protection window PW1', and thus, the contamination detector 200 may detect an accumulated amount of the particles P accumulated on the second region PA2 of the first protection window PW1'.

The contamination detector 200 may automatically detect contamination of the second region PA2 of the first protection window PW1' at a predetermined time period. For example, the detection period of the contamination detector 200 may be set by considering a time period of the laser machining process and the number of the laser machining processes.

The detection period of the contamination detector 200 may match a replacement period of the second substrate SUB2. Detecting contamination of the second region PA2 of the first protection window PW1' may be performed at a time point at which the laser machining performed on the second substrate SUB2 is finished. For example, the detecting of the contamination of the second region PA2 of the first protection window PW1' may be performed in a state in which the second substrate SUB2 is unloaded from the process region A1 of the first vacuum chamber CH1 by the carrier CR.

In addition, the second substrate SUB2 may include a plurality of substrates, and in this case, a replacement time point of the second substrate SUB2 may be a time point at which machining performed on the plurality of substrates is finished.

Figure 12:
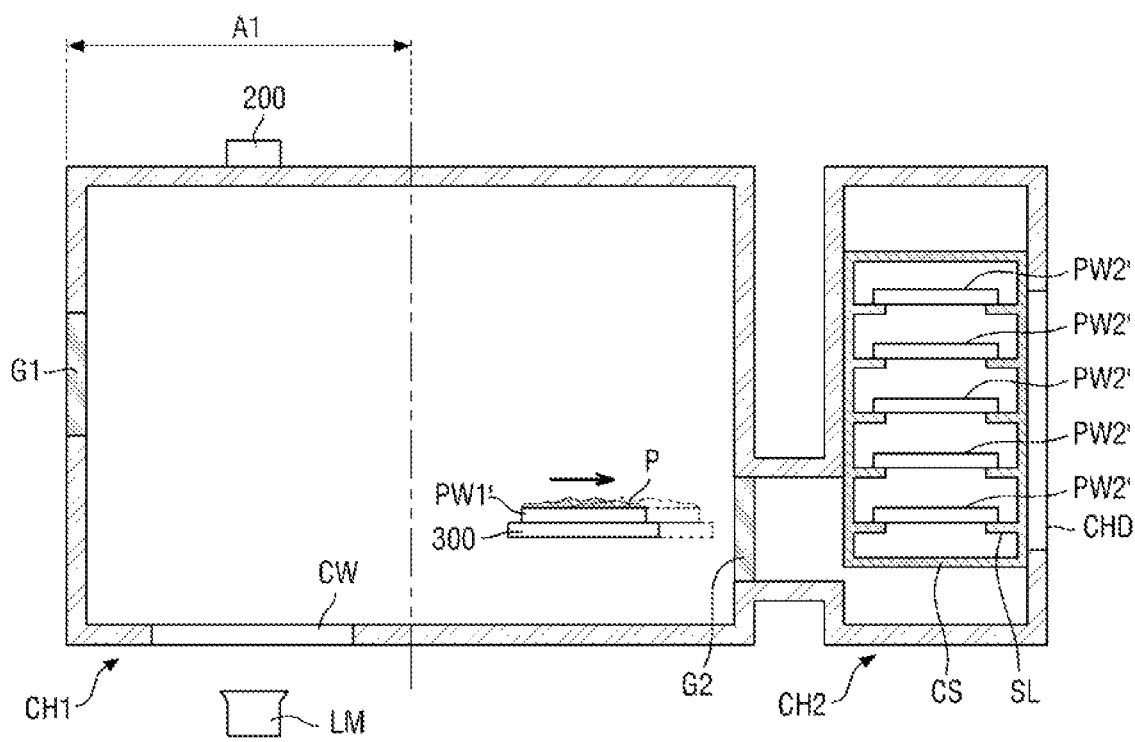
Figure 13:
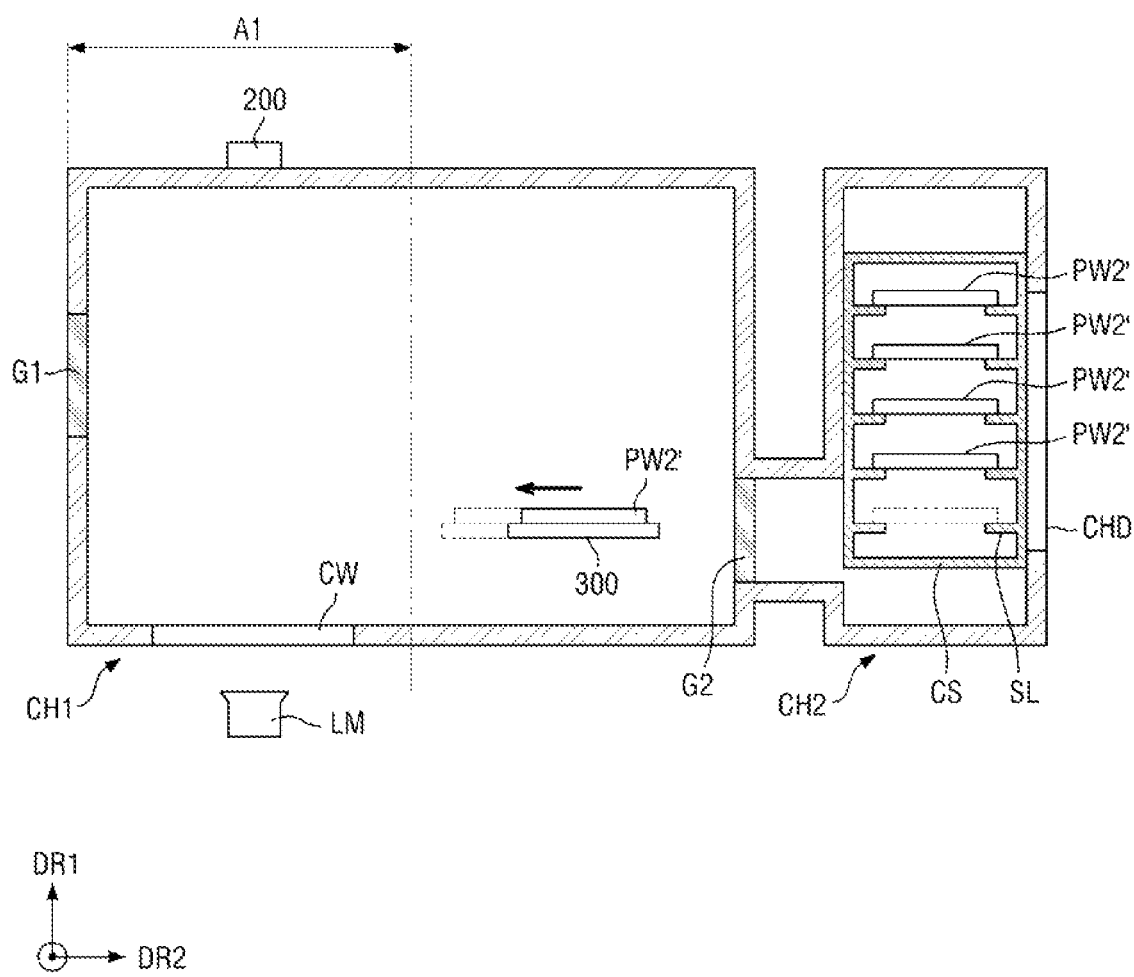

Referring to FIGS. 12 and 13, in a case in which a front surface of the first protection window PW1', for example, the first region PA1 and the second region PA2, reaches a contamination threshold (e.g., a critical value), the first protection window PW1' is automatically transferred to the outside of the process region A1 of the first vacuum chamber CH1 by a transfer unit 300. The first protection window PW1' may be transferred to a second vacuum chamber CH2 by the transfer unit 300. Here, the first protection window PW1' may be transferred to the second vacuum chamber CH2 through a second gate valve G2.

In addition, a second protection window PW2' stored in the second vacuum chamber CH2 is transferred to the process region A1 of the first vacuum chamber CH1 by the transfer unit 300. For example, the contaminated first protection window PW1' and the second protection window PW2', which replaces the first protection window PW1', may be replaced with each other by the transfer unit 300. The second protection window PW2' may be transferred to the first vacuum chamber CH1 through the second gate valve G2.

As described above, even when the protection window is replaced, the second vacuum chamber CH2 may be maintained in a vacuum state by a vacuum pump and a vacuum valve. Accordingly, even when the second gate valve G2 is opened to transfer the second protection window PW2', a degree of vacuum of the first vacuum chamber CH1 may not be affected. For example, when the first protection window PW1' is contaminated, the first protection window PW1' may be replaced with the second protection window PW2' while a high vacuum environment of the first vacuum chamber CH1 is maintained. Accordingly, laser machining can be performed in a high vacuum environment without opening the chamber.

In FIGS. 12 and 13, a case in which the first protection window PW1' is transferred first is illustrated, but the present invention is not limited thereto. For example, after the second protection window PW2' is transferred to the process region A1 of the first vacuum chamber CH1, the first protection window PW1' may also be unloaded, or the first protection window PW1' and the second protection window PW2' may be simultaneously transferred to be replaced with each other.

Figure 14:
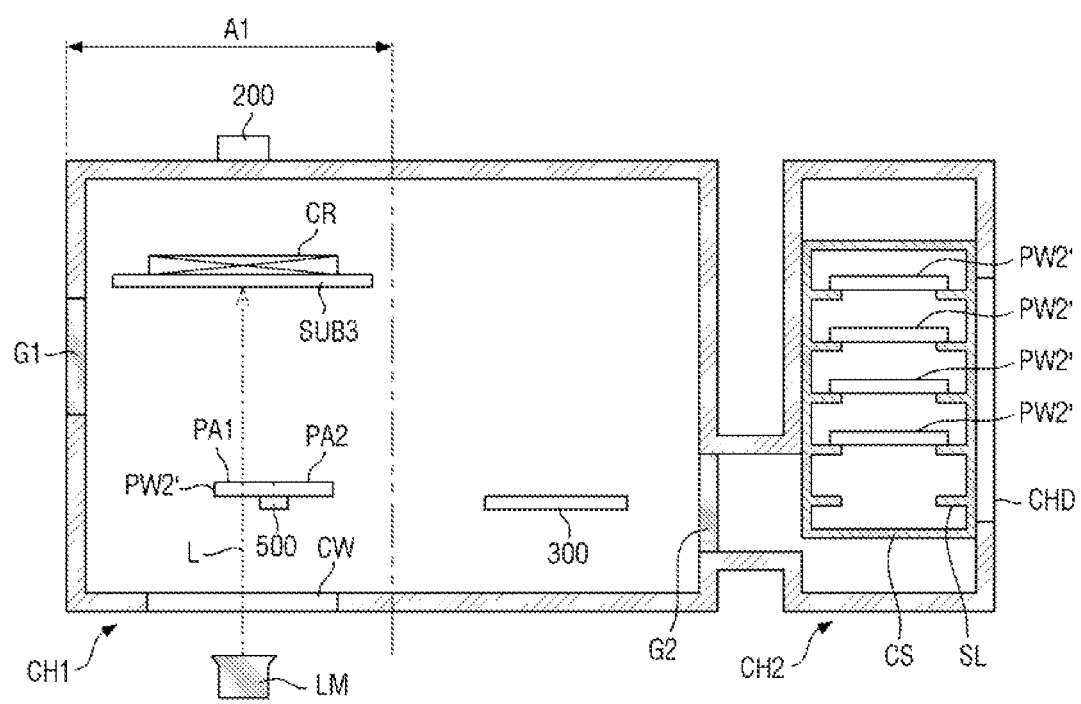

Referring to FIG. 14, laser machining is performed on a third substrate SUB3. When the laser machining is performed on the third substrate SUB3, the first region PA1 of the second protection window PW2' may overlap the chamber window CW and a region in which a laser beam L is emitted. For example, the first region PA1 of the second protection window PW2' may overlap the laser module LM and may be in a path of the laser beam L emitted from the laser module LM. In this case, the protection window moving module 500 may serve to move the second protection window PW2' such that the first region PA1 of the second protection window PW2' overlaps the region in which the laser beam L is emitted. For example, the protection window moving module 500 may move the second protection window PW2' a predetermined distance in a direction opposite to the second direction DR2 such that the first region PA1 of the second protection window PW2' overlaps the laser module LM.

The laser beam L emitted by the laser module LM may pass through the chamber window CW and enter the first vacuum chamber CH1. The light, which has passed through the chamber window CW, may pass through the first region PA1 of the second protection window PW2' and be emitted onto one surface of the third substrate SUB3.

As described above, in the laser apparatus and the laser machining method according to the present embodiment, when the first region PA1 of each of the protection windows PW1' and PW2' is contaminated, the protection window moving module 500 may move each of the protection windows PW1' and PW2' a predetermined distance to use the second region PA2 of the protection windows PW1 and PW2' as particles P have accumulated on a surface of the first region PA1. Accordingly, since a replacement period of each of the protection windows PW1' and PW2' can be increased, production efficiency of the laser apparatus can be increased.

In addition, the first protection window PW1' may be automatically replaced with the second protection window PW2' while the contamination detector 200 detects contamination of the first protection window PW1' and a high vacuum environment of the first vacuum chamber CH1 may be maintained. Accordingly, laser machining can be continuously performed in a high vacuum environment without opening the chamber. In addition, since the laser machining can be performed in the high vacuum environment, penetration of moisture or oxygen into an LED of a substrate SUB can be minimized. Accordingly, reliability of the substrate SUB, for example, component reliability of a display, can be increased.

FIG. 15 is a block diagram of the laser apparatus according to an exemplary embodiment of the preset invention.

Referring to FIG. 15, a controller 100 of the laser apparatus according to the present embodiment may control operation of the protection window moving module 500. The protection window moving module 500 may move each of the protection windows PW1' and PW2' a predetermined distance such that a specific region thereof overlaps the laser module LM while being operated by the controller 100.

In this case, the controller 100 receives a signal to control the operation of the protection window moving module 500, and the signal may be provided by at least one of the contamination detector 200, a process time detector 410, or a process number detector 420.

The contamination detector 200 detects an accumulated amount of particles P accumulated on each of the protection windows PW1' and PW2' and transmits information thereof to the controller 100.

The process time detector 410 detects an etching or drilling process time period for each substrate SUB and transmits information thereof to the controller 100.

The process number detector 420 detects the number of etching or drilling processes performed on the substrates SUB and transmits information thereof to the controller 100.

In FIG. 15, a case in which the contamination detector 200, the process time detector 410, and the process number detector 420 are used, is illustrated, but the present invention is not limited thereto. For example, at least one among the contamination detector 200, the process time detector 410, and the process number detector 420 may also be used. For example, the controller 100 may receive information from the contamination detector 200, the process time detector 410, and/or the process number detector 420, and control the protection window moving module 500 such that a portion of each of the protection windows PW1' and PW2' that is not contaminated with particles P is positioned to overlap the laser module LM.

The controller 100 may include a central processing unit 110 and a memory 120.

Since the central processing unit 110 and the memory 120 have been described with reference to FIG. 7, the repetitive descriptions thereof will be omitted.

While the present invention has been described with reference to exemplary embodiments thereof, it will be understood by those of ordinary skill in the art that various changes in form and details may be made thereto without departing from the spirit and scope of the present invention.

What is claimed is:

1. A laser machining method comprising:
   arranging a first protection window in a first vacuum chamber, wherein the first vacuum chamber includes a chamber window, and the first protection window overlaps the chamber window;
   arranging a first target substrate in the first vacuum chamber;
   emitting a laser beam through the chamber window and the first protection window to perform laser machining on the first target substrate;
   transferring the first protection window to a second vacuum chamber disposed at a side of the first vacuum chamber; and
   transferring a second protection window from the second vacuum chamber to the first vacuum chamber.

2. The laser machining method of claim 1,
   wherein the laser beam is emitted by a laser facing the first vacuum chamber, wherein the laser beam is emitted to one surface of the first target substrate through the chamber window and the first protection window.

3. The laser machining method of claim 1, further comprising detecting contamination of the first protection window after performing laser machining of the first target substrate.

4. The laser machining method of claim 1, wherein:
   the first vacuum chamber further includes a gate valve positioned at a first side thereof, and wherein the first protection window is transferred to the second vacuum chamber through the gate valve.

5. The laser machining method of claim 1, further comprising, after the transferring of the second protection window to the first vacuum chamber, arranging a second target substrate in the first vacuum chamber to overlap the second protection window.

6. The laser machining method of claim 5, further comprising emitting the laser beam through the chamber window and the second protection window to perform laser machining on the second target substrate.

* * * * *